UNITED STATES PATENT OFFICE.

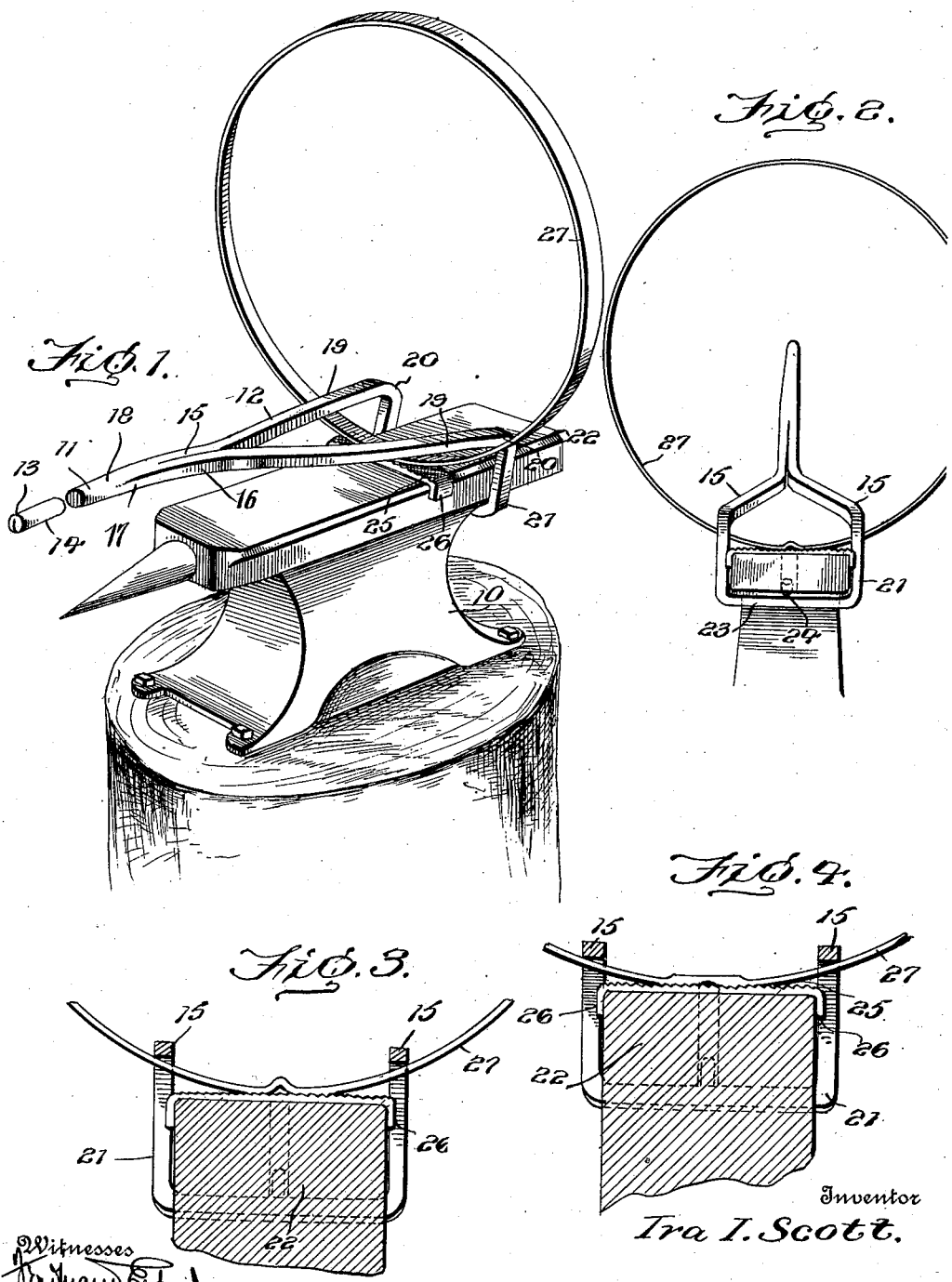

IRA I. SCOTT, OF KINGMAN, KANSAS.

TIRE-SHRINKER.

1,079,803.  Specification of Letters Patent.  Patented Nov. 25, 1913.

Application filed March 13, 1913. Serial No. 754,050.

*To all whom it may concern:*

Be it known that I, IRA I. SCOTT, citizen of the United States, residing at Kingman, in the county of Kingman and State of Kansas, have invented certain new and useful Improvements in Tire-Shrinkers, of which the following is a specification.

This invention relates to an improvement in tire shrinking tools.

The primary object of the invention is to provide means for shrinking metallic tires without the use of a complicated mechanism or two or more workmen in assembling and shrinking a tire.

A further object of the invention is to provide a tool which consists practically of a single member which may be used on an anvil or other suitable support to shrink a tire in a simple manner and without the necessity of employing skilled workmen.

Another object of the invention is to provide a tool which may be conveniently transported and which is applicable to almost any form of support in the shrinking of a tire.

A still further object of the invention is to provide a tool which may be constructed of a single bar, thereby providing a structure which will be more durable in practice and more economical to manufacture than devices which embody numerous movable parts.

For a full understanding of the invention, reference is to be had to the following description and accompanying drawing, in which:

Figure 1 is a perspective view showing the device in use; Fig. 2 is a front elevation; Fig. 3 is a sectional view showing the tire before it has been shrunk; and Fig. 4 is a sectional view showing a tire after it has been shrunk.

Corresponding and like parts are referred to in the following description and indicated in all the views of the drawing by the same reference characters.

In the drawing, 10 designates an anvil which is of the usual construction, and while an anvil has been shown as the supporting structure, attention is called to the fact that any suitable supporting member may be used.

The tool consists of a single bar of material 11 bent intermediate its ends to form a yoke 12, its terminals 13 and 14 being welded or otherwise secured together. The substantially parallel portions 15 and 16 of the bar are curved as at 17 to raise the handle portion 18 above the diverging portions 19 of the bar. The yoke 12 is bent at the point 20, the bar being bent to form an extension 21 which, as illustrated in the drawing, is disposed to embrace the portion 22 of the anvil. This portion of the anvil is provided with a number of apertures, and the intermediate portion 23 of the yoke may be provided with a stud or projection 24 disposed to enter one of said apertures. While the intermediate portion of the yoke is provided with such a projection, this projection is not essential to the operation of the device, the projection forming a holding means which prevents movement of the member longitudinally of the anvil.

The tool may be made in various sizes, dependent upon the character of the work to be performed, but it is preferably constructed of a bar of material of approximately six feet in length, thereby providing a portion which extends away from the anvil of approximately three feet in length. It will be noted that a pipe may be placed on the bar to increase its length. Thus the necessary leverage is secured in forcing the device in contact with the tire.

A plate 25, which is formed with a serrated surface, is placed upon the anvil, said plate being provided with the downwardly extending portions 26 which embrace the sides of the anvil and prevent its movement transversely of the same. This plate is of greater width than the tire which is to be shrunk, and while a specially constructed plate is illustrated, it will be obvious that when the device is used, for instance, with a section of rail, as a support, that a rasp, file, or in fact any plate with a serrated surface may be used.

The tire 27 is heated and bent or buckled upwardly over the edge of the anvil by means of a hammer until it takes the form of an inverted V, approximately an inch in height in the usual size buggy tire. The tool is then inserted through the tire which is placed upon the plate 25, and the extension of the yoke 12 brought beneath the anvil, the stud 24 extending through the opening formed therein. It will be noted that the diverging arms 19 will contact with the tire on both sides of the point where it contacts centrally with the plate 25. The handle portion 18 is then depressed, the operator bearing his weight upon said handle portion and hammering down the inverted V or buckled part, thereby stoving or upsetting the heated portion until the tire is preferably of less diameter than the wheel. Afterward, in the process of smoothing out with the hammer, the tire can be brought to its proper measurement.

The many advantages of a construction of this character will be clearly apparent, as it will be noted that the shrinking of the tire may be accomplished without the use of a mechanism including a number of independent parts, the only implement necessary in addition to the tool being a hammer and serrated plate. It will thus be noted that the device may be carried within a vehicle and a tire shrunk on a suitable support without the delay of taking the vehicle to a wheelwright or machine shop. It will also be seen that the construction is simple in its operation, thus permitting those unskilled in the art to effectually manipulate the same. It will also be apparent that the device may be easily and economically manufactured, and that, while being of such a weight that it may be easily transported, it will be sufficiently durable and of such a construction that its operation will not be affected by excessive or improper use. It will be noted that the bar where it engages with the support may be provided with various forms of engaging members to conform to different supporting members.

Having thus described my invention, what I claim as new and desire to secure by Letters Patent is:

A tire shrinking tool comprising a bar bent intermediate its terminals, said terminals being secured together, the bar intermediate its ends being bent to form a yoke, the side members of which diverge from the connected terminals of the bar, said yoke being bent at right angles to provide an anvil embracing portion.

In testimony whereof I affix my signature in presence of two witnesses.

IRA I. SCOTT. [L. S.]

Witnesses:
CARRIE HOVEY,
J. C. HOVEY.

Copies of this patent may be obtained for five cents each, by addressing the "Commissioner of Patents, Washington, D. C."